United States Patent [19]
Johnson

[11] Patent Number: 6,157,391
[45] Date of Patent: Dec. 5, 2000

[54] METHOD AND APPARATUS FOR PROVIDING SLOW MOTION VIDEO AT NORMAL MOTION PLAY SPEED

[75] Inventor: William J. Johnson, Flower Mound, Tex.

[73] Assignee: International Business Machines Corporation, Armonk, N.Y.

[21] Appl. No.: 08/179,458

[22] Filed: Jan. 10, 1994

[51] Int. Cl.[7] .................................................. G06T 1/00
[52] U.S. Cl. .......................................................... 345/473
[58] Field of Search .................................. 395/152–154; 360/10.1; 348/61, 578, 722; 345/473, 474, 455, 302

[56] References Cited

U.S. PATENT DOCUMENTS

| | | | |
|---|---|---|---|
| 3,637,928 | 1/1972 | Poulett | 360/10.1 |
| 4,860,096 | 8/1989 | Long et al. | 348/61 |
| 5,105,313 | 4/1992 | Stewart | 348/578 |
| 5,237,648 | 8/1993 | Mills et al. | 395/152 |
| 5,355,450 | 10/1994 | Garmon et al. | 348/578 |
| 5,359,712 | 10/1994 | Cohen et al. | 395/161 |

*Primary Examiner*—Joseph H. Feild
*Attorney, Agent, or Firm*—Geoffrey A. Mantooth

[57] ABSTRACT

A stream of video frames that is provided to a display device at a normal speed is processed to provide slow motion of a selected segment of the stream. Processing involves creating a dilated stream of the video frames. Each original frame of the segment is copied. The copied frames are located in the dilated stream adjacent to their respective original frames. The dilated stream is then provided to the display device at the normal playing speed. Slow motion of a segment or frames is provided by playing plural copies of each frame before playing the next frame. All the frames in the segment can be copied the same number of times. Alternatively, the frames in the segment can be copied an uneven number of times, wherein the frames near the beginning and end of the segment are copied fewer times than the frames in the middle of the segment.

6 Claims, 12 Drawing Sheets

METHOD AND APPARATUS FOR PROVIDING SLOW MOTION VIDEO AT NORMAL MOTION PLAY SPEED

TECHNICAL FIELD OF THE INVENTION

The present invention relates to methods and apparatuses for providing video to display devices, and in particular to providing slow motion video.

BACKGROUND OF THE INVENTION

Digital video players present video information to one or more users. One example of a digital video player is a personal computer or data processing system. The video information is stored digitally on a storage device. The video player retrieves the stored video information and presents the information to the user on a display screen.

When playing video information, occasionally a user desires to view the video information in slow motion. For example, a user may wish to view in more detail a particular video frame or clip of frames. However, with prior art video players, if a user wants to enjoy slow motion capability, the user must manually play the video information in slow motion. One technique for accomplishing this is where a user displays the video information one frame at a time. The user manually starts and stops the flow of video information to the display device.

In order to free the user of this involvement, it is desirable to have an automated method for producing slow motion in video segments, which segments are played at their normal speed.

SUMMARY OF THE INVENTION

It is an object of the present invention to provide a method and apparatus for providing a slow motion presentation of video information that is played at normal speed on a display device.

The present invention provides a method and apparatus for providing slow motion to a video information stream, which stream is provided to a display. The video information stream contains frames, with each of the frames having a place in the stream relative to other frames in the stream. A segment of the frames is identified. The frames in the segment are original frames. The segment is dilated by replicating the original frames. For each of the original frames, the respective replicated frames are placed in the stream adjacent to the original frame.

The present invention dilates a stream of video frames to provide slow motion. The dilated stream contains copies of those frames which are to be played in slow motion. When a segment is viewed in slow motion, plural or multiple copies of each frame are played before the next frame and its copies are played.

By providing a dilated output stream, the output stream can be provided to a display at the same normal speed that the undilated stream is provided to the display when normal motion viewing is desired. Yet, in spite of the dilated and the undilated streams being played at the same speeds on the display, the dilated stream provides slow motion.

In accordance with one aspect of the present invention, a constant replication value is used to copy the frames. Each frame in the segment of slow motion frames is copied a number of times that is equal to the constant replication value. Thus, each frame in the segment is copied the same number of times.

In accordance with another aspect of the present invention, a non-constant replication value is used to copy the frames in the segment. The segment has beginning frames, intermediate frames and ending frames. The intermediate frames are copied a greater number of times than the number of times that the beginning and end frames are copied.

In accordance with another aspect of the present invention, a method and apparatus for processing a stream of original video frames for a display device is provided. The original video frames are provided to the display device at a first speed. The stream of original video frames is intercepted before the stream is provided to the display device. A dilated output stream of the original video frames is created by processing each original frame in the stream of original video frames. Each original video frame is processed by determining if the original frame is to be copied. If the original frame is not to be copied, then the original frame is provided to the output stream. If the original frame is to be copied, then the original frame is provided to the output stream and, at least one copy of the original frame is also provided to the output stream before the next original frame is processed. The dilated output stream is then provided to the display device at the first speed.

DESCRIPTION OF THE INVENTION

Figure 1:
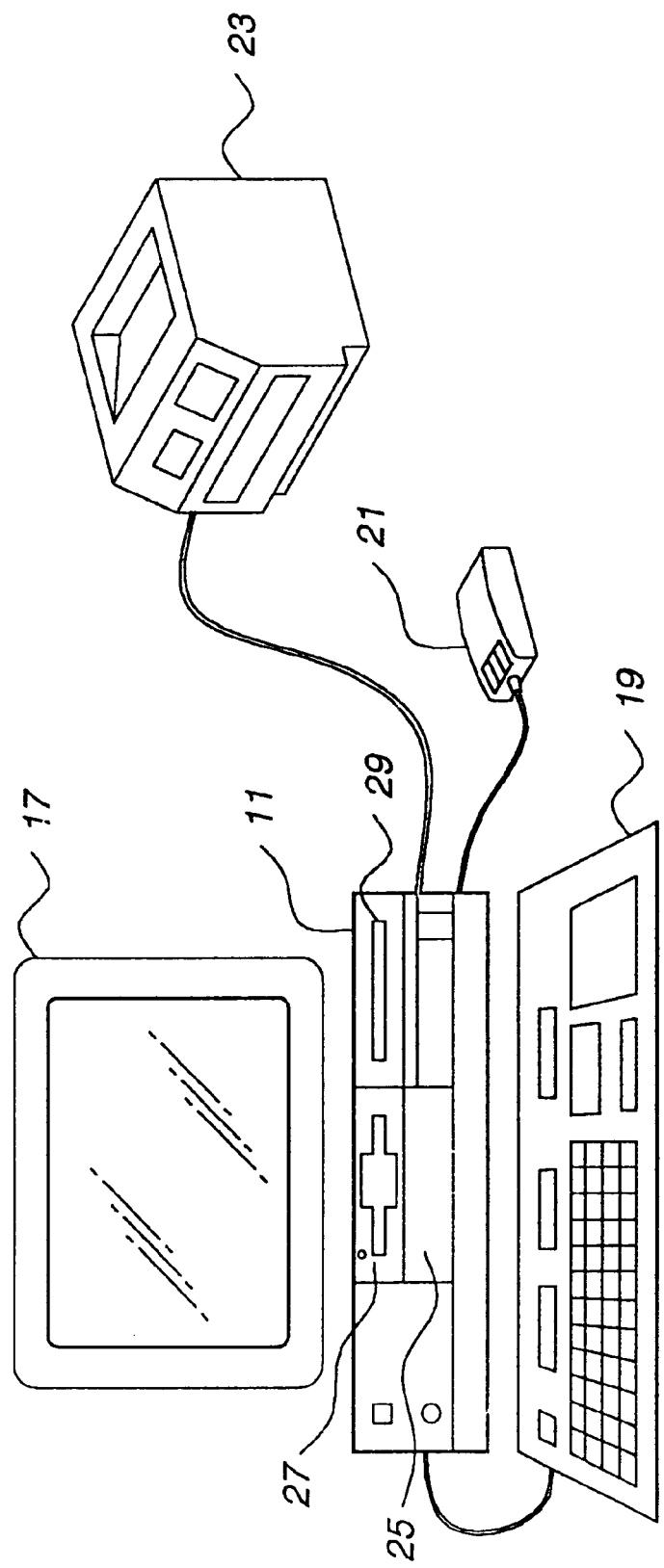
FIG. 1 shows a personal computer upon which the present invention can be practiced.

In FIG. 1, there is shown a personal computer 11, or data processing system, upon which the present invention can be practiced. The computer 11 has input devices in the form of a keyboard 19 and a mouse 21. Other input devices, such as a touch screen and a microphone and voice recognition, can be provided. The computer 11 also has output devices such as a display screen 17 and a printer 23. The computer typically includes a fixed (or hard) disk drive 25 and a removable (or floppy) disk drive 27, which serve as storage devices.

The computer also has a Central Processing Unit (CPU) and internal memory in the form of Random Access Memory (RAM) and Read Only Memory (ROM). When the computer is on and operating, the internal memory contains resource objects such as an operating system and the method represented by the flow charts of FIGS. 4a–4 d. The CPU executes the method of FIGS. 4a–4d.

The computer 11 provides video information to the display screen 17. The video information is provided by suitable storage devices, such as a Compact Disk-Read Only Memory (CD-ROM) device 29. CD-ROM disks are widely used to store video information. Another source to store video information is a fixed disk array. The video information storage device can be located at or on the computer as in the case of the CD-ROM drive 29. Alternatively, the storage device can be remotely located from the computer and accessed over a network or other communication link. For example, the computer can access a fixed disk array over a local area network. Although the present invention is being described herein in conjunction with personal computers, the present invention can also be utilized in conjunction with other types of digital video players.

When the computer provides video information to the display screen 17, the video information is retrieved from the appropriate video storage device. Some processing may be necessary to provide the video information in a form that is suitable for the display screen. For example, the video information may have to be decompressed. This processing can be performed by the CPU inside of the computer. Alternatively, the processing can be performed by a video adapter located inside of the computer. (External video adapters may also be used.)

Figure 2:
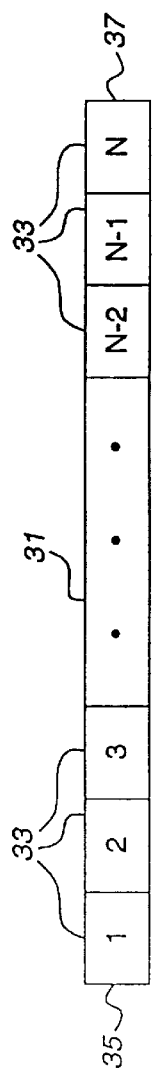
FIG. 2 shows a stream of video frames.

The result of the processing is a video stream 31, as shown in FIG. 2. The video stream 31 is made up of many video frames 33. Each frame 33 contains enough information to provide a single picture on the display screen 17. If the video information shows a dynamic display (that is objects shown on the screen are moving) then each frame is different from the preceding and the succeeding frames. At the beginning 35 of the video stream is frame 1, while at the end 37 of the video stream is frame N. The frames are provided to the display screen 17 by the computer 11, one frame at a time, in sequential order. The provision of the frames to the display screen occurs at a fixed speed. This fixed speed is referred to as normal playing speed. Thus, the presentation of the video stream at normal playing speed takes some amount of time.

The present invention manipulates the video stream 31 so as to provide the video information in slow motion. The video stream is manipulated by replicating frames and adding the frame copies to the video stream. Thus, the presentation of the video stream is effectively dilated over time. The presentation of a dilated video stream takes a greater amount of time than does the presentation of an undilated video stream.

Figure 3:
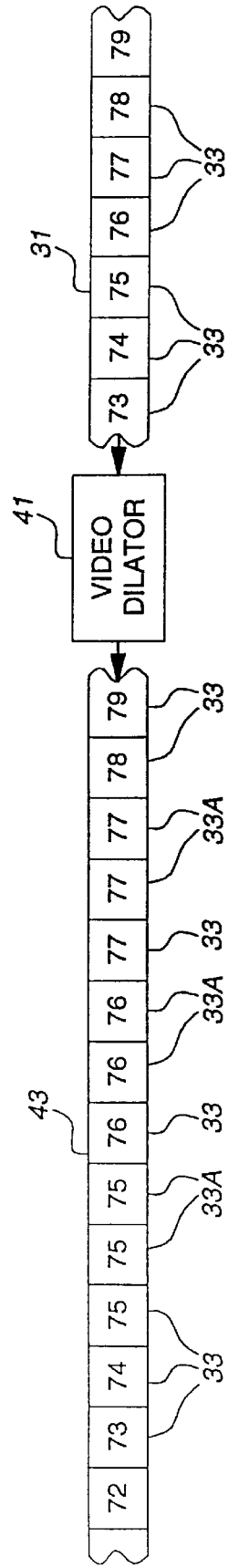
FIG. 3 is a block diagram of the apparatus of the present invention, in accordance with the preferred embodiment, showing input and output video streams.

Referring to FIG. 3, the video dilator 41 of the present invention is shown. The undilated video stream 31 is input into the video dilator 41. The video dilator 41 produces a dilated output video stream 43, wherein selected frames have been copied. In the output video stream 43 shown in FIG. 3, two additional copies 33A of each of frames 75, 76 and 77 have been inserted into the data stream after the respective original frames 75, 76, 77. Thus, when the dilated video stream 43 is played on the display screen 17, frames 75, 76 and 77 will be displayed three times longer than the other frames in the stream, effectively slowing down any motion provided by that segment of frames.

The output stream 43 is typically provided to a display buffer.

Referring now to FIG. 4a–4d, the flow chart illustrating the method of the present invention will be described. In the flow chart, the following graphical conventions are utilized: a rectangle is used to illustrate a process or function, a diamond is used to illustrate a decision, a parallelogram is used to illustrate an input or output function and a circle and an arrow are used to illustrate off page connectors. These conventions are well understood by programmers skilled in the art of data processing systems, and the flow chart is sufficient to enable a programmer skilled in the art to write code in any suitable computer programming language, such as C or PASCAL for a computer such as the IBM Personal System/2 (PS/2) family of computers which support these languages. (Personal System/2 and IBM are trademarks of International Business Machines Corporation.)

Figure 4A:
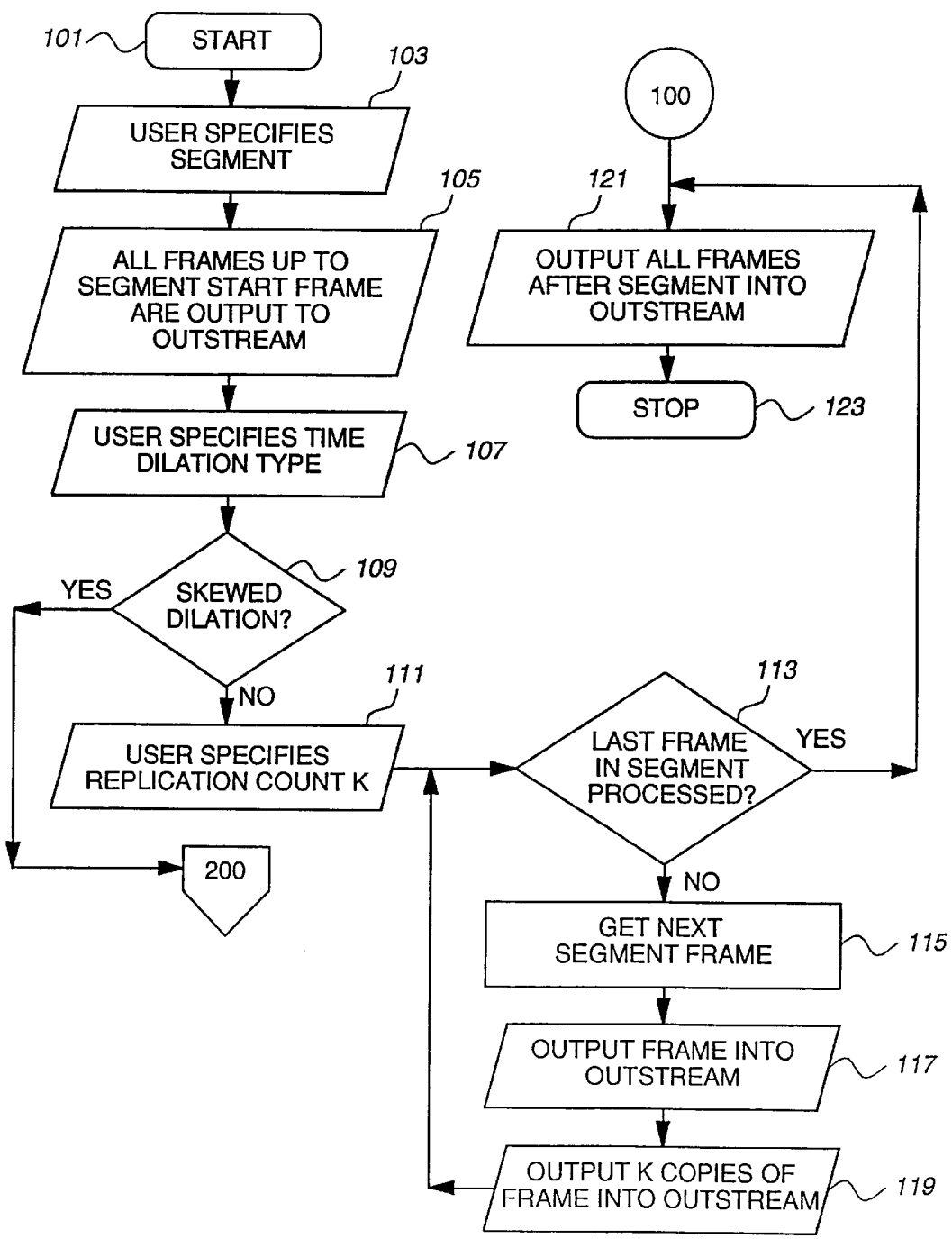
FIGS. 4a–4d are a flow chart of the method of the present invention, in accordance with a preferred embodiment.

The method of FIGS. 4a–4d is started when invoked by a user, step 101 of FIG. 4a. Invocation can occur, for example, by the user pressing an appropriate key on the keyboard 19, selecting a menu choice from a pull down menu on the display screen 17, or by the provision of some other user input. User inputs discussed throughout this description can be provided by a variety of user interfaces and with a variety of input devices.

The user then specifies a segment of the video information stream 31 (see FIGS. 2 and 3) or file which is to be displayed in slow motion, step 103. The user can specify that the segment comprises either the entire video information file (for example, referring to FIG. 2, frames 1 to N) or only a portion thereof (for example, frames 75–77). To specify a segment, various techniques can be utilized. For example, the beginning and end of the segment can be marked with start and stop bits, which bits are inserted into the data stream. Alternatively, the beginning of the segment can be marked by start bits, while the end of the segment is specified by a number of frames from the beginning frame. Alternatively, both the beginning and ending frames can be designated by offsets from the first frame of the video information stream. Still another way to specify the segment is to use predicate descriptors. For example, the beginning of the segment could be specified as the first frame which contains 80% blue pixels, while the end of the segment is the last frame that contains the text "shiloh". Still another way to specify the segment is through the use of time parameters. For example, the beginning of the frame could be specified as being located 30 seconds, or 900 frames, from the start of the video information file. Still other ways could be utilized to specify the segment.

After the slow motion segment has been specified, in step 105 those frames which precede the segment are output to the output video stream 43. Referring to the example of FIG. 3, wherein the specified video segment begins at frame 75, frames 1–74 are output to the output video stream 43. The frames within the specified video segment will be copied before being output to the output video stream. The copying occurs in the remaining steps.

In step 107 of FIG. 4a, the user specifies the type of time dilation. The types of time dilation will first be discussed in general terms, followed by a more specific discussion with reference to the flow chart steps. In the preferred embodiment, the user can select either a constant time dilation or a skewed time dilation.

If a constant time dilation is specified, then each frame in the segment is copied a constant number of times before being provided to the output video stream. Thus, referring to FIG. 3, the user sees frames 1–74 played in normal motion. Beginning at frame 75, the user sees slow motion. After frame 77, the user again sees the frames displayed in normal motion.

If a skewed time dilation is specified, then each frame is copied a number of times before being provided to the output video stream. Frames that are in the middle of the segment are copied a larger number of times than are frames near the beginning and end of the segment. For example, referring to FIG. 5, the specified segment is from frame 71 to frame 81. The middle frame, which is frame 76, has the largest number of copies (120 copies), while the end frames 71 and 81 have the smallest number of copies (20 copies). The number of copies of frames increases from the start frame 71 to the middle frame 76 and then decreases from the middle frame 76 to the end frame 81. Thus, the user sees frames 1–70 played in normal motion. The user sees the motion slowing down beginning at frame 71. Playing motion continues to slow down until frame 77, wherein the motion begins to speed up again. After frame 81, the user again sees normal motion. With skewed time dilation, the change between normal motion and slow motion is more gradual than with constant time dilation.

Combinations of constant time dilation and skewed time dilation can be provided in order to provide gradual speed motion changes before and after relatively long constant slow motion segments (of three or more frames).

All of the frames in the normal motion and slow motion segments are played by the display 17 at normal speed.

Constant time dilation will be discussed first. In step 109 of FIG. 4a, the method determines the type of dilation that has been specified by the user. If constant time dilation has been specified, then the result of step 109 is NO and the method proceeds to step 111 to await a user input. In step 111, the user specifies the replication count, which count is referred to as K. In steps 113–119, the method enters a loop wherein each frame in the specified segment is copied. In step 113, the method determines if the last frame in the segment has been processed. This is done by comparing the last frame to be processed by steps 117 and 119 with the end of the segment as specified in step 103.

If the result of step 113 is NO, then the method proceeds to step 115. In step 115, the method gets the next segment frame. Referring again to the example of FIG. 3, the method gets frame 75, because it is the first frame of the specified segment. In step 117 of FIG. 4a, this frame is output to the output video stream 43. In step 119, K copies of the frame are output to the output video stream 43. In the example of FIG. 3, K=2. Thus, the output video stream 43 contains three frames 75 (the original and the two "K" copies). After step 119 of FIG. 4a, the method returns to step 113. Frames 76 and 77 are then similarly copied.

When the last frame in the segment has been processed, the result of step 113 is YES. The method then proceeds to step 121, wherein all frames after the specified segment are output to the output video stream. Referring to FIG. 3, frames 78–N are thus output to the output video stream 43. After step 123 of FIG. 4a, the method stops, step 123.

Figure 4B:
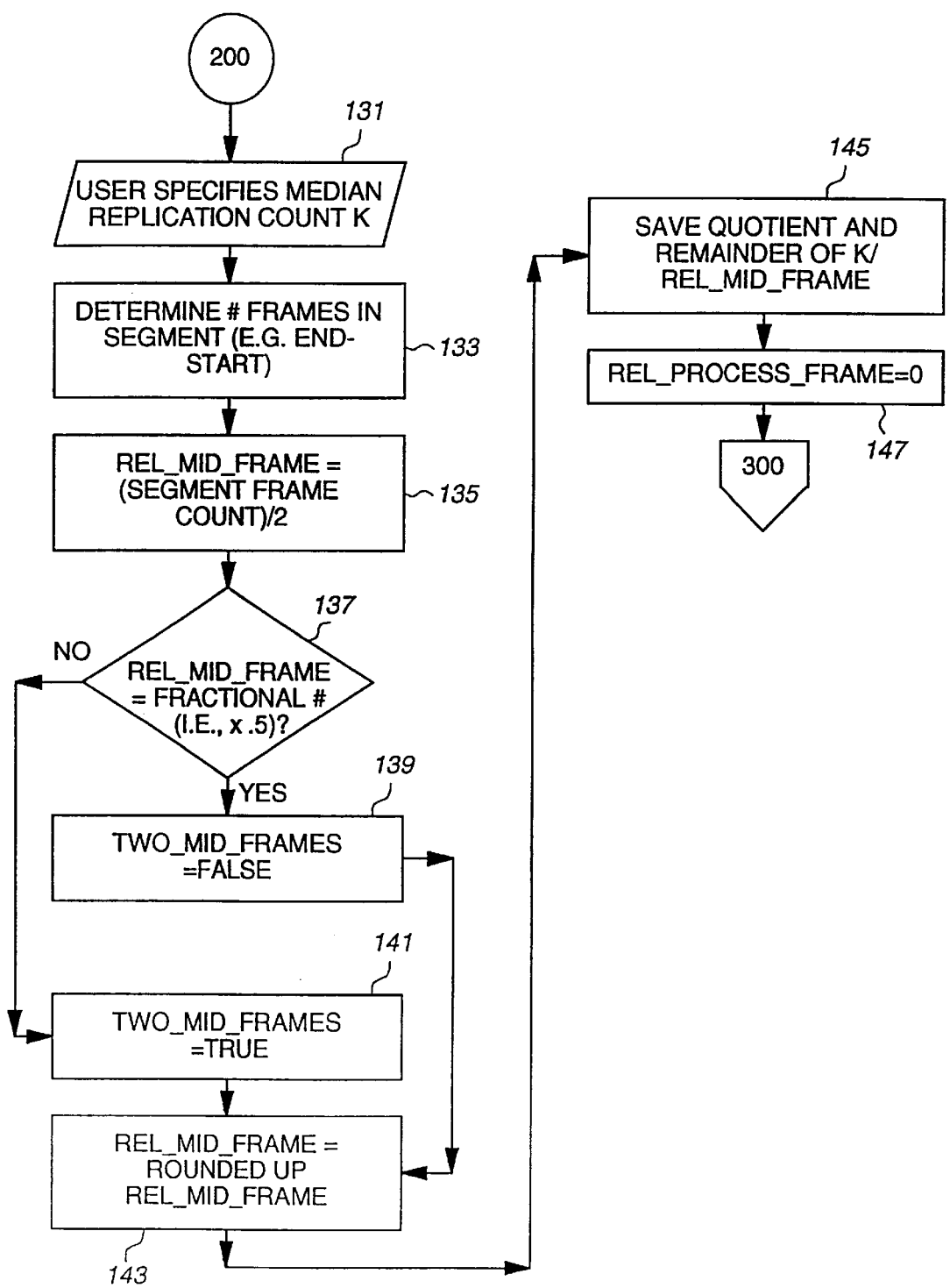

Skewed time dilation will now be discussed with reference to the flow chart of FIGS. 4a–4d and the example of FIG. 5. If the user selects skewed time dilation in step 107 of FIG. 4a, then the result of step 109 is YES. The method then proceeds, by way of connectors 200, to step 131 of FIG. 4b. In step 131, the user specifies a median replication count K. This is the number of copies that are to be made of the middle or median frame or frames of the segment. In the example of FIG. 5, the median replication (or, as sometimes given in the Figs., "duplication") count is 120. In step 133 of FIG. 4b, the method determines the number of frames in the segment. In the example of FIG. 5, the number of frames in the segment of frames 71–81 of the input video stream 31A is 11. Then, in step 135 of FIG. 4b, a parameter referred to as REL_MID_FRAME (for relative middle frame) is determined by dividing the number of frames in the segment by two. In the example of FIG. 5, REL_MID_FRAME= 11/2=5.5. In step 137 of FIG. 4b, the method determines if REL_MID_FRAME is a fractional number. If the number of frames in the segment is an odd number, then the REL_MID_FRAME is a fractional number and the result of step 137 is YES. The method then sets a parameter referred to as TWO_MID_FRAMES to FALSE, in step 139. This indicates that there is only one middle frame. After step 139, the method proceeds to step 143. If the number of frames in the segment is an even number (such as shown in FIG. 6 where REL_MID_FRAME=12/2=6) then the result of step 137 of FIG. 4b is No and the method proceeds to step 141. In step 141, TWO_MID_FRAMES is set to TRUE. This indicates that there are two middle frames. After step 141, the method proceeds to step 143.

In step 143, the REL_MID_FRAME is rounded up, if REL_MID_FRAME has a fractional part. Thus, with the example of FIG. 5, REL_MID_FRAME is rounded from 5.5 to 6. If REL_MID_FRAME has no fractional part, then the number is already in rounded up form. In step 145 of FIG. 4b, the parameters QUOTIENT and REMAINDER of K/(REL_MID_FRAME) are determined and saved. In the example of FIG. 5, QUOTIENT=120/6=20, with no REMAINDER.

In step 147 of FIG. 4b, a parameter called REL_PROCESS_FRAME (for relative process frame) is set to 0. REL_PROCESS_FRAME is a counter that steps from the beginning frame in the segment to the end frame in the segment. After step 147, the method proceeds, by way of connectors 300, to step 149 of FIG. 4c.

In step 149, the method determines if the last frame of the segment has been processed. If the result of step 149 is NO, then in step 151, the method gets the next (or first) frame. In step 153, the method adds 1 to the REL_PROCESS_FRAME (for the first frame in the segment, REL_PROCESS_FRAME, which had been 0, is now 1). The next frame in the segment is added to the output video stream, step 155. In the example of FIG. 5, frame 71, which is the first frame of the segment, is added to the output video stream 43A. In step 157 of FIG. 4c, the method determines if the REL_PROCESS_FRAME is before or after the middle frame or frames of the segment. This is achieved by determining if the REL_PROCESS_FRAME (which is 1 in the example) is less than the REL_MID_FRAME (which is 6 in the example).

If the result of step 157 is YES, the REL_PROCESS_FRAME is before the middle frame (which is correct for frame 71 of FIG. 5), then the method proceeds to step 159. In step 159, the number of copies is determined from QUOTIENT*REL_PROCESS_FRAME and output to the output video stream. In the output of FIG. 5, the number of copies is 20*1. Thus, 20 copies of frame 71 are provided to output video stream 43a. (Frame 71 will be shown to the user 21 times, which is the original frame plus 20 copies, at normal playing speed.) In step 161 of FIG. 4c, the method determines if the REL_PROCESS_FRAME is less than the difference of the REL_MID_FRAME—REMAINDER. In the example of FIG. 5, the result of step 161 is YES, because 1 is less than 6–0. In the example of FIG. 5, a YES will always be produced because the REMAINDER is 0.

After step 161, the method loops back to step 149, wherein frame 72 is processed. Frame 72 is copied 40 times because in step 153, REL_PROCESS_FRAME now is 2 and in step 159, QUOTIENT (20)*REL_PROCESS_FRAME (2)=40. Thus, the number of copies increases. Frame 71 has 20 copies, frame 72 has 40 copies, frame 73 has 60 copies, frame 74 has 80 copies and frame 75 has 100 copies.

When frame 76 is processed, REL_PROCESS_FRAME now is 6. This produces a NO result in step 157, wherein the method proceeds, by way of connectors 400, to step 163 of FIG. 4d to process the middle frame or frames. In step 163, the method determines if TWO_MID_FRAMES=TRUE. In the example of FIG. 5, TWO_MID_FRAMES=FALSE because there is only one middle frame 76, thereby producing a NO result from step 163. The method then proceeds to step 165 to determine if REL_PROCESS_FRAME=REL_MID_FRAME. Step 165 determines if the middle frame is being processed. In the example of FIG. 5, REL_PROCESS_FRAME (6) does equal REL_MID_FRAME (6), so that a YES is produced by step 165. In step 167, K copies are placed into the output video stream 43A. In the example of FIG. 5, 120 copies of frame 76 are output. After step 167, the method returns, by way of connectors 500, to step 149 of FIG. 4c.

Figure 4C:
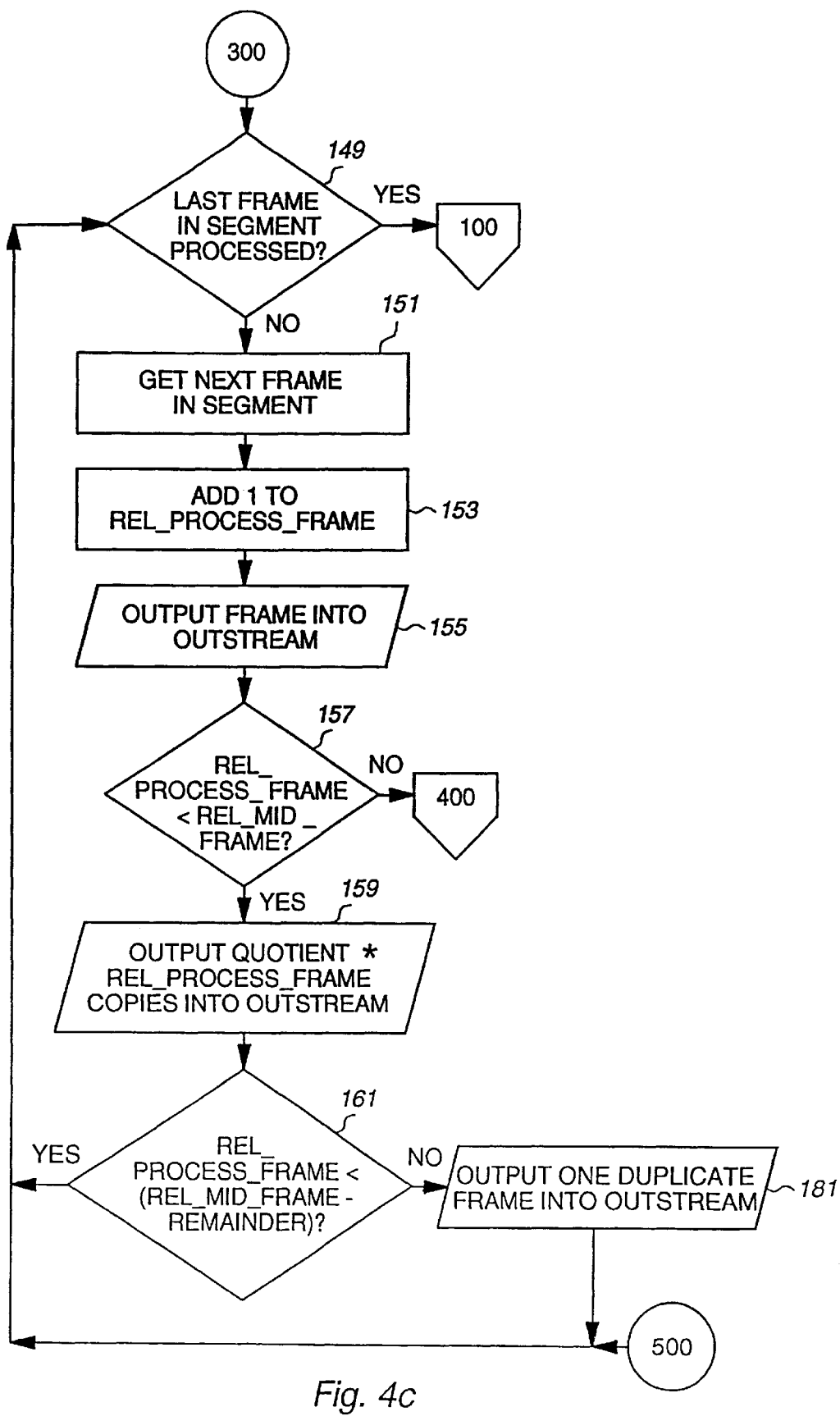
Figure 4D:
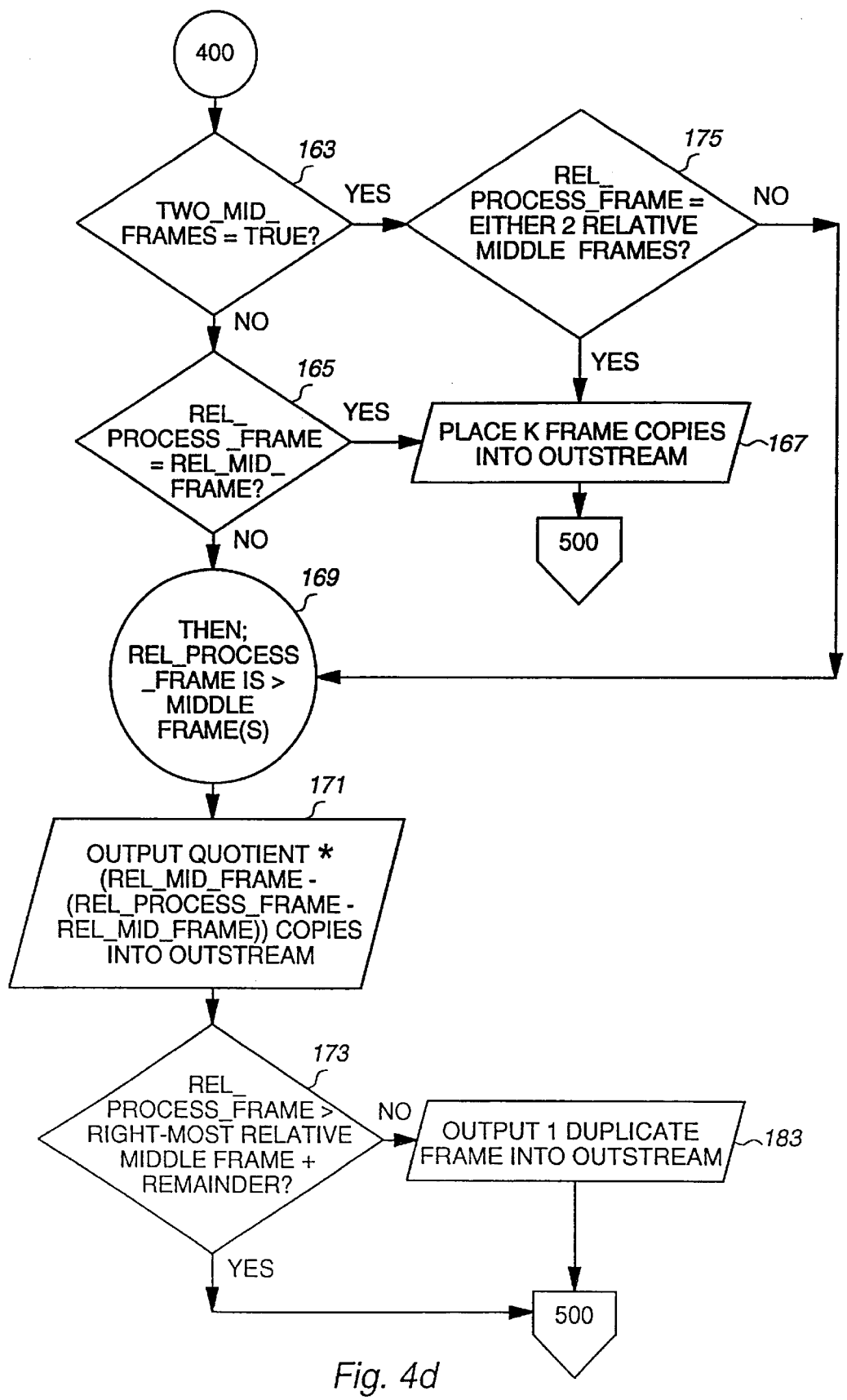
Figure 5:
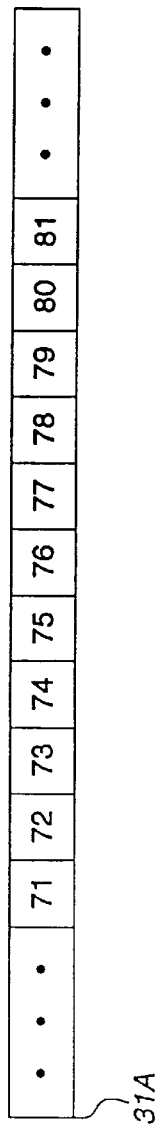
FIGS. 5–10 are schematic representations of video stream segments, which segments illustrate examples of the present invention. The top portion of each Fig. shows an input video stream, while the bottom portion of each Fig. shows the resulting output video stream produced by the present invention.
Figure 5:
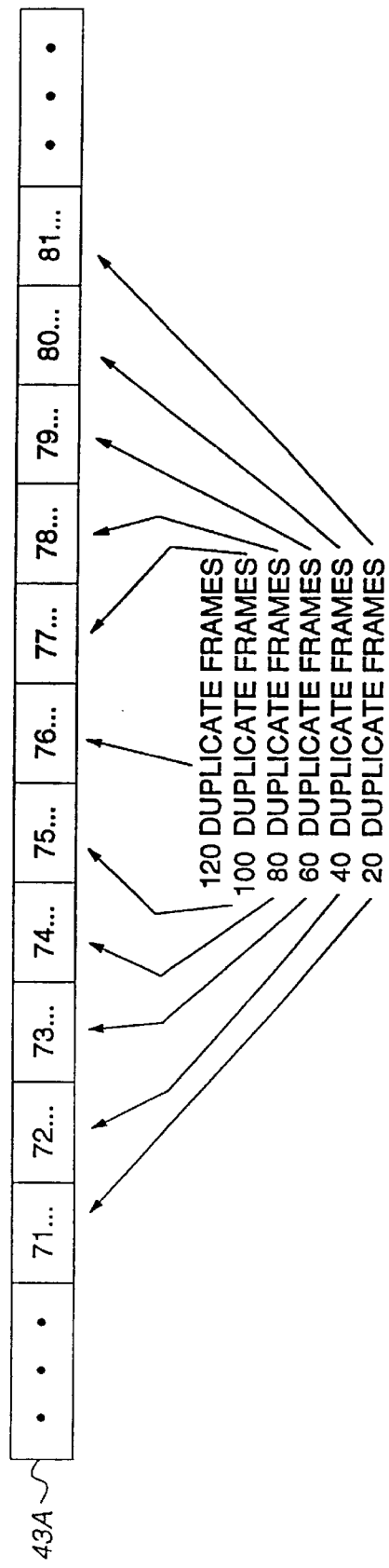
Figure 6:
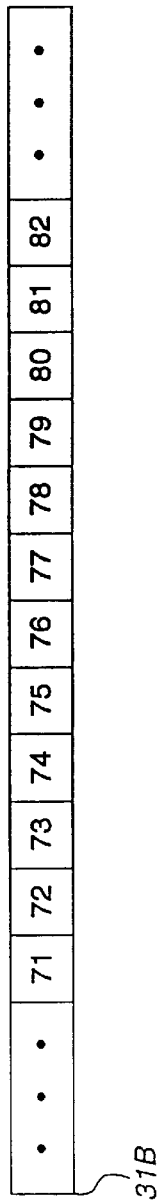
Figure 6:
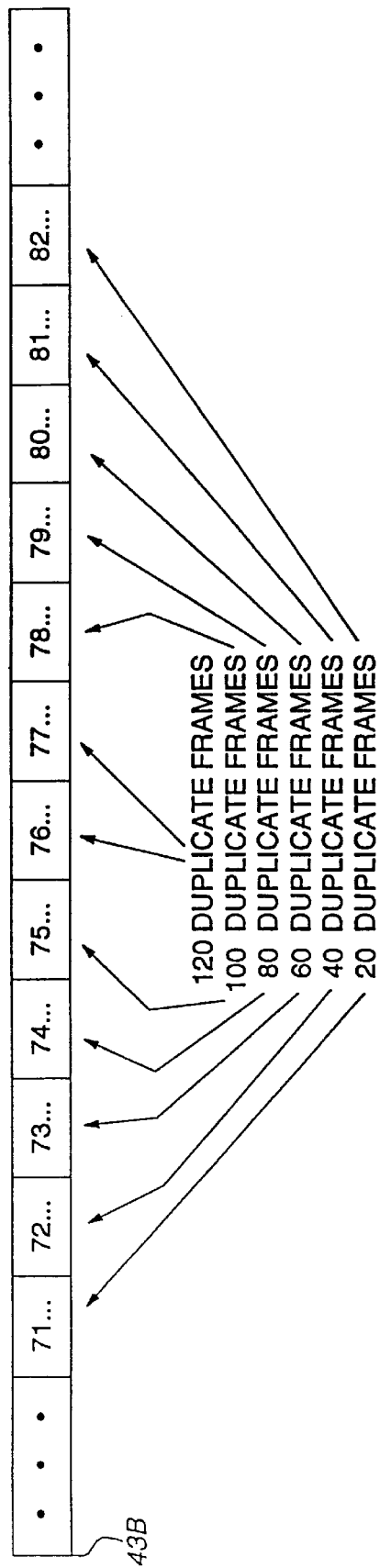

In step 153 of FIG. 4c, REL_PROCESS_FRAME is incremented to 7(for frame 77 of FIG. 5). The number of copies made of each frame now begins to decrease. NO results are produced by steps 157, 163 and 165, wherein as noted by the comment 169, the REL_PROCESS_FRAME is now greater than the middle frame or frames. In step 171, the number of copies output is:

QUOTIENT*(REL_MID_FRAME-(REL_PROCESS_FRAME-REL_MID_FRAME)).

In the example of FIG. 5, the number of copies of frame 77 is:

20*(6-(7-6))=100.

Thus, 100 copies of frame 77 are output to the output video stream 43a. In step 173, the method determines if there is a REMAINDER to account for by determining if the REL_PROCESS_FRAME is greater than the rightmost relative middle frame plus the REMAINDER. The rightmost relative middle frame is used because there may be two relative middle frames. In the example of FIG. 5, step 173 produces a YES because 7is greater than 6+0. Thus, for the example of FIG. 5, the method proceeds back to step 149. As the frames continue to be processed, the REL_PROCESS_FRAME increases, causing the number of copies output by step 171 to decrease. Thus, frame 77 has 100 copies, frame 78 has 80copies, frame 79 has 60 copies, frame 80 has 40 copies, and frame 81 has 20 copies.

Finally, when the last frame in the segment has been processed, the result of step 149 is YES. The method then returns by way of connectors 100, to step 121 to output the frames that are after the processed segment.

Referring now to FIG. 6, the input video stream 31B has an even number of frames. Thus, there are now two middle frames 76 and 77. This causes TWO_MID_FRAMES to be set to TRUE in step 141 of FIG. 4b. In step 163 of FIG. 4c, the result is YES, wherein the method proceeds to step 175. In step 175, the method determines if REL_PROCESS_FRAME equals either of the two relatively middle frames. In the example of FIG. 6, step 165 is not reached for frames 71-75 and the results of step 165 is NO for frames 78-82, wherein the method proceeds to step 171 to copy the frames as described above. For frames 76 and 77, a YES is produced by step 175, wherein each frame 76 is copied 120 times in step 167 in the output video stream 43b of FIG. 6. The method then loops back to repeat steps 175 and 167 so as to copy frame 77 120 times.

Figure 7:
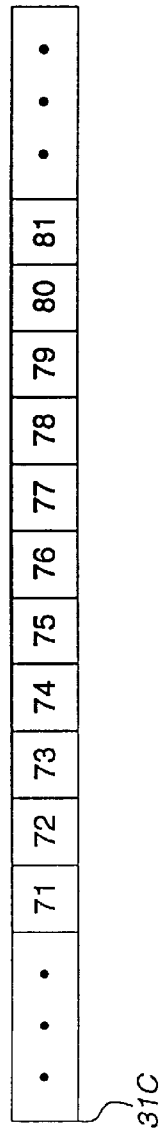
Figure 7:
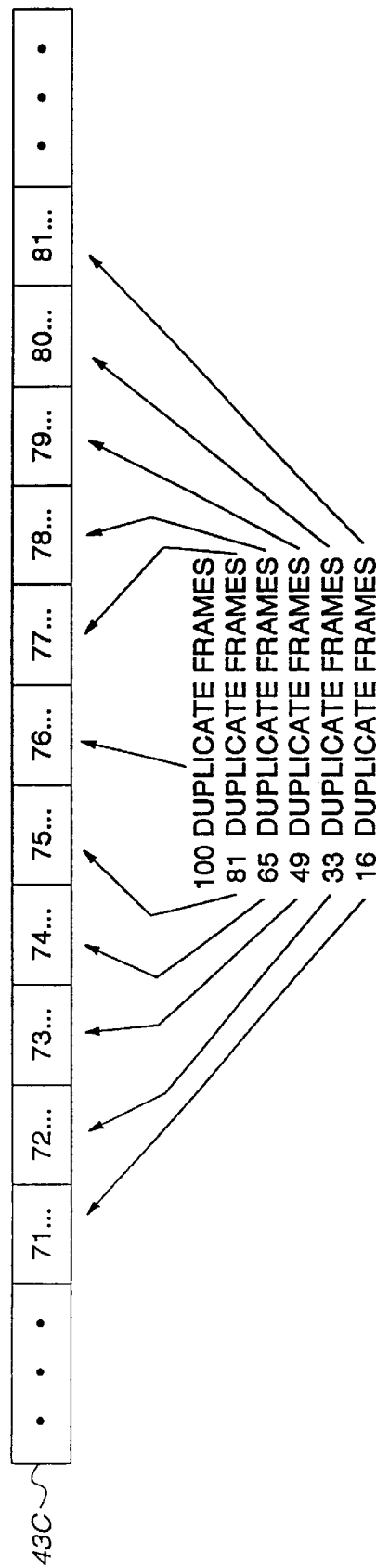

Referring now to FIG. 7, an example is given wherein the user has specified in step 131 of FIG. 4b that the median replication count is 100 (instead of 120 as in FIGS. 5 and 6). The input video stream 31C has an odd number of frames in the segment. In step 145, the QUOTIENT is 100/6=16 with a REMAINDER of 4. Because there is a REMAINDER, extra copies of frames are output to further smooth the change in motion speeds. An extra copy is added to the four (because REMAINDER=4) frames (frames 72-75) immediately preceding the middle frame 76 and to the four frames (frames 77-80) immediately following the middle frame. Step 161 of FIG. 4c determines if a frame preceding the middle frame is copied one extra time. For frame 71, the result of step 161 is YES, because 1is less than (6-4). For frame 72, the result of step 161 is NO because 2 is not less than (6-4). The method then proceeds to step 181, wherein one additional frame 72 is output to the output video stream 43c. Thus, frame 72 has 33 copies. One additional copy is also provided for frames 73-75. For frame 77, the method determines in step 173 that a REMAINDER should be accounted for. A NO result is produced by step 173 because 7 is not greater than 6+4. Thus, the method proceeds to step 183 to output an additional copy of frame 77.81 copies of frame 77 are thus produced. Similarly, one additional copy is provided to each of frames 78-80. Frame 81 is only copied 16 times instead of 17 times because a YES result is produced by step 173.

Figure 8:
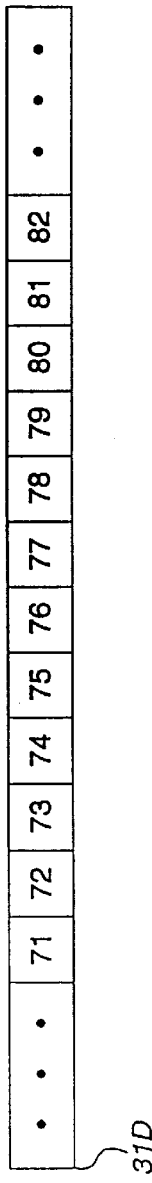
Figure 8:
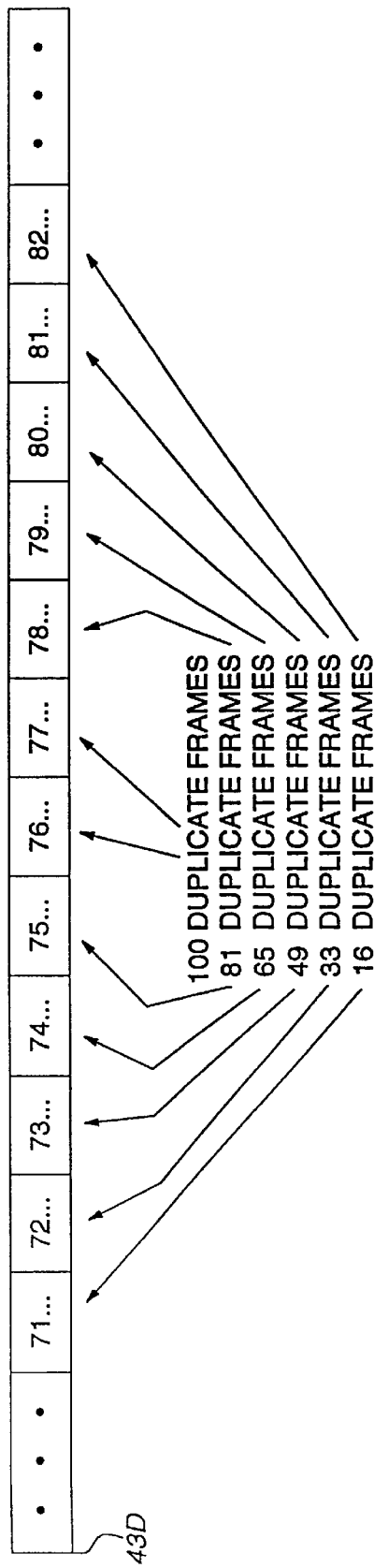

In the example of FIG. 8, the input video stream 31D segment has an even number of frames. The median replication count is 100. Thus, the output video stream 43D is similar to the output video stream 43C of FIG. 7, except that there are two middle frames (76 and 77) both of which have 100 copies. The four frames (72-75) immediately preceding the middle frames (76, 77) and the four frames (78-81) immediately following the middle frames are provided with an additional copy in order to account for the REMAINDER of 4.

Figure 9:
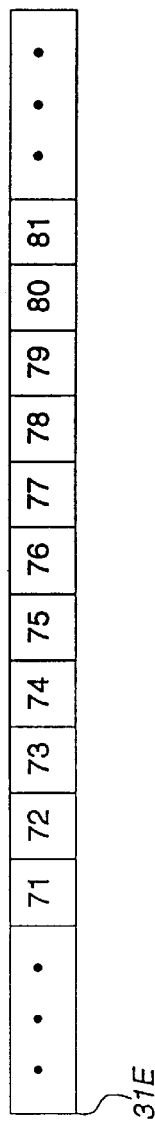
Figure 9:
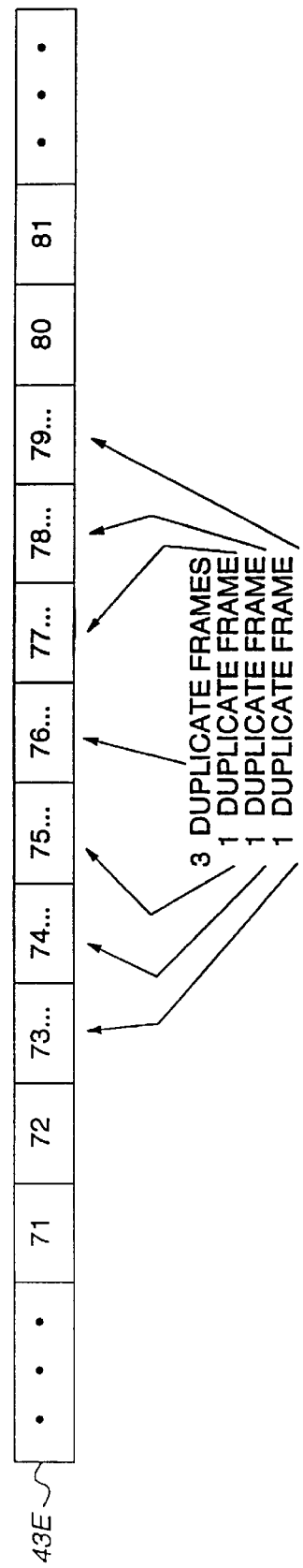

In the example of FIG. 9, the input video stream 31E has an odd number of frames in the segment, similar to the example of FIG. 7. However, the user has specified the median duplication count as 3. Thus, the QUOTIENT is 0, with a REMAINDER of 3. Frame 76 is copied 3 times to the output stream 43E. Because there is a remainder, the three frames (73,74,75) preceding the middle frame 76 and the three frames (77,78,79) succeeding the middle frame 76 are copied once. Frames 71,72,80 and 81 are not copied at all.

Figure 10:
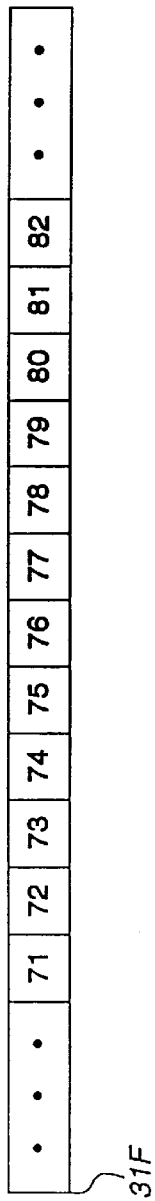
Figure 10:
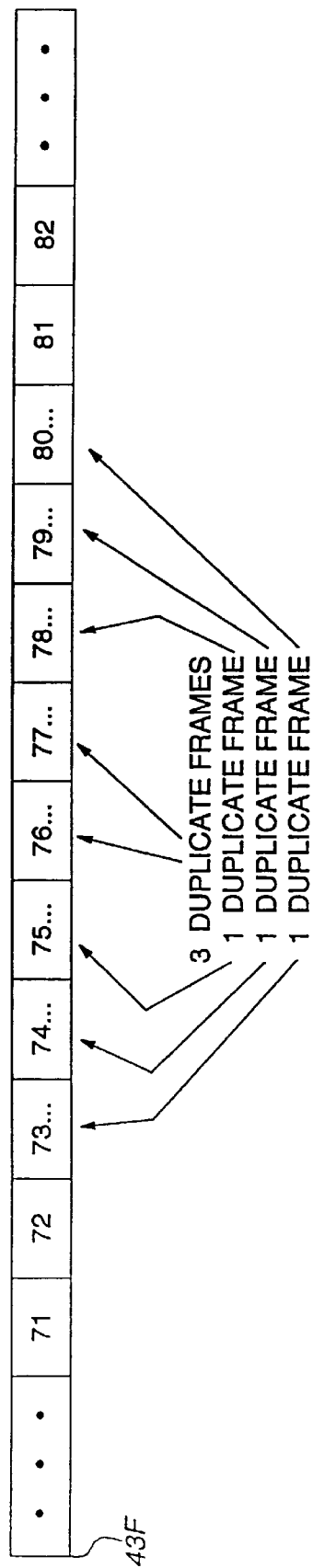

In the example of FIG. 10, which is similar to the example of FIG. 9, except that there is an even number of frames in the input segment 31F, the two middle frames 76 and 77 are both copied 3 times. Frames 73, 74, 75, 78, 79, and 80 are each copied once, while frames 71, 72, 81 and 82 are not copied to the output stream 43F.

To remove the slow motion effects from the video stream, either the original video stream can be utilized by the display device or the dilated video stream can be utilized by stripping away the copied frames.

Those skilled in the art should appreciate that frames may be replicated as they are encountered and displayed by an algorithm coupled to the display means. Thus, an entire output stream need not be produced before displaying any frames.

Those skilled in the art should also appreciate that, without departing from the spirit and scope of the invention, a skewed dilation may consist of a segment containing beginning and end frames such that the beginning frame is copied N times and dilation increases or decreases to the end frame which is copied K times. For example, referring to FIG. 5, a skewed dilation segment can have its beginning frame at 76 (which is copied 120 times) and its end frame at 81 (which is copied 20 times). Alternatively, the skewed dilation segment can have its beginning frame at 71 (which is copied 20 times) and its end frame at 76 (which is copied 120 times).

The foregoing disclosure and the showings made in the drawings are merely illustrative of the principles of this invention and are not to be interpreted in a limiting sense.

What is claimed is:

1. A computer implemented method of providing slow motion to a video information stream that is provided to a display, said video information stream containing frames, each of said frames having a place in said video information stream relative to said other frames in said video information stream, comprising the steps of:
   a) identifying a segment of said frames, said frames in said segment being original frames, said segment having beginning frames, intermediate frames and ending frames;
   b) dilating said segment by replicating said original frames to produce replicated frames, and for each of said original frames, placing said respective replicated frames in said video information stream adjacent to said original frame;
   c) said step of replicating said original frames further comprises the step of replicating said intermediate frames a greater number of times than the number of times that said beginning and ending frames are replicated.

2. A computer implemented method of providing slow motion to a video information stream that is provided to a display, said video information stream containing frames, each of said frames having a place in said video information stream relative to said other frames in said video information stream, comprising the steps of:
   a) identifying a segment of said frames, said frames in said segment being original frames, said segment has first and second ends, with frames at each end;
   b) dilating said segment by replicating said original frames to produce replicated frames, and for each of said original frames, pacing said respective replicated frames in said video information stream adjacent to said original frame;
   c) said step of replicating said original frames further comprises the step of replicating said original frames at said first end a greater number of times than the number of times that said frames at said second end are replicated.

3. A computer implemented method of providing slow motion to a video information stream that is provided to a display, said video information stream containing frames, each of said frames having a place in said video information stream relative to said other frames in said video information stream, comprising the steps of:
   a) identifying a segment of said frames, said frames in said segment being original frames, said segment has a beginning frame, at least one middle frame and an ending frame;
   b) determining a replication value;
   c) determining said middle frame and the number of frames in said segment;
   d) determining a quotient according to:
      quotient=said replication value/a rounded up value/a rounded up value of (the number of frames in said segment/2)wherein said quotient is one or greater;
   e) determining a first position of each of said frames from said beginning frame to said middle frame, said first position being relative to said beginning frame;
   f) dilating said segment by replicating said original frames to produce replicated frames, and for each of said original frames, placing said respective replicated frames in said video information stream adjacent to said original frame;
   g) said step of replicating said original frames further comprising the step of copying each of said frames from said beginning frame to said middle frame a first number of times according to:
      third number of times=said first position*said quotient;
   h) said step of replicating said original frames further comprising the step of copying said middle frame a second number of times corresponding to said replication value;
   i) determining a second position of each of said frames from said ending frame to said middle frame, said second position being relative to said ending frame; and
   j) said step of replicating said original frames further comprising the step of copying each of said frames from said middle frame to said ending frame a third number of times according to:
      third number of times=said second position*said quotient.

4. An apparatus for providing slow motion to a video information stream that is provided to a display, said video information stream containing frames, each of said frames having a place in said video information stream relative to said other frames in said video information stream, comprising:
   a) means for identifying a segment of said frames, said frames in said segment being original frames, said segment having beginning frames, intermediate frames and ending frames;
   b) means for dilating said segment, said means for dilating said segment comprising means for replicating said original frames to produce replicated frames, and means for placing said respective replicated frames in said video information stream adjacent to each of said original frames;
   c) said means for replicating said original frames further comprises means for replicating said intermediate frames a greater number of times than the number of times that said beginning and ending frames are replicated.

5. An apparatus for providing slow motion to a video information stream that is provided to a display, said video information stream containing frames, each of said frames having a place in said video information stream relative to said other frames in said video information stream, comprising:
   a) means for identifying a segment of said frames, said frames in said segment being original frames, said segment has first and second ends, with frames at each end;
   b) means for dilating said segment, said means for dilating said segment comprising means for replicating said original frames to produce replicated frames, and means for placing said respective replicated frames in said video information stream adjacent to each of said original frames;
   c) said means for replicating said original frames further comprises means for replicating said original frames at said first end a greater number of times than the number of times that said frames at said second end are replicated.

6. An apparatus for providing slow motion to a video information stream that is provided to a display, said video information stream containing frames, each of said frames having a place in said video information stream relative to said other frames in said video information stream, comprising:

a) means for identify a segment of said frames, said frames in said segment being original frames, said segment has a beginning frame, at least one middle frame and an ending frame;

b) means for determining a replication value;

c) means for determining said middle frame and the number of frames in said segment;

d) means for determining a quotient according to:
quotient=said replication value/a rounded up value of(the number of frames in said segment/2) wherein said quotient is one or greater;

e) means for determining a first position of each of said frames from said beginning frame to said middle frame, said first position being relative to said beginning frame;

f) means for dilating said segment, said means for dilating said segment comprising means for replicating said original frames to produce replicated frames, and means for placing said respective replicated frames in said video information stream adjacent to each of said original frames;

g) said means for replicating said original frames further comprising means for copying each of said frames from said beginning frame to said middle frame a first number of times according to:
first number of times=said first position*said quotient;

h) said means for replicating said original frames further comprising means for copying said middle frame a second number of times corresponding to said replication value;

i) means for determining a second position of each of said frames from said ending frame to said middle frame, said second position being relative to said ending frame; and j) said means for replicating said original frames further comprises means for copying each of said frames from said middle frame to said ending frame a third number of times according to:
third number of times=said second position*said quotient.

* * * * *